United States Patent [19]
Garcia, Jr. et al.

[11] Patent Number: 5,119,480
[45] Date of Patent: Jun. 2, 1992

[54] BUS MASTER INTERFACE CIRCUIT WITH TRANSPARENT PREEMPTION OF A DATA TRANSFER OPERATION

[75] Inventors: Serafin J. E. Garcia, Jr., Boynton Beach; Douglas R. Chisholm, Chatelaine; Dean A. Kalman, Lantana; Russell S. Padgett, Royal Palm Beach; Robert D. Yoder, Delray Beach, all of Fla.

[73] Assignee: International Business Machines Corporation, Armonk, N.Y.

[21] Appl. No.: 434,385

[22] Filed: Nov. 13, 1989

[51] Int. Cl.$^5$ .............................................. G06F 13/32
[52] U.S. Cl. ................................ 395/325; 364/241.2; 364/241.3; 364/242.3; 364/242.31; 364/242.32; 364/242.6; 364/941; 364/941.1
[58] Field of Search ................................ 364/200, 900

[56] References Cited

U.S. PATENT DOCUMENTS

| | | | |
|---|---|---|---|
| 4,270,167 | 5/1981 | Koehler et al. | 364/200 |
| 4,620,278 | 10/1986 | Ellsworth et al. | 364/200 |
| 4,777,591 | 10/1988 | Chang et al. | 364/200 |
| 4,837,677 | 6/1989 | Burrus, Jr. et al. | 364/200 |
| 4,901,226 | 2/1990 | Barlow | 364/200 |
| 4,953,103 | 8/1990 | Suzuki | 364/200 |
| 4,959,782 | 9/1990 | Tulpule et al. | 364/200 |

Primary Examiner—Allen R. MacDonald
Assistant Examiner—Robert S. Hauser
Attorney, Agent, or Firm—Martin J. McKinley

[57] ABSTRACT

A plurality of specialized controllers (e.g., 202, 204 & 206), each one adapted to control a particular type of data transfer operation, control the flow of data between a system bus (104) and a local bus (106) on a computer adapter card (102). When the Direct Memory Access (DMA) controller (202) is controlling a DMA operation on the local bus, certain other controllers (204 & 206) can break-in to the current DMA operation, temporarily halting the DMA opertion until the other controller has completed its data transfer operation. To break-in to a DMA operation, handshaking signals between the DMA controller and the local bus interface circuit (212) are temporarily blocked by blocking signals from a break-in logic circuit (210). The break-in circuit includes a four-state state machine to block the handshaking signals at the appropriate times, and to signal the interrupting controller to begin its data transfer operation. When breaking-in to a DMA operation in this manner, the operation of the DMA controller is not altered; instead, to the DMA controller, it appears that the local bus interface circuit is merely slow to respond with its acknowledge handshake.

14 Claims, 5 Drawing Sheets

BUS MASTER INTERFACE CIRCUIT WITH TRANSPARENT PREEMPTION OF A DATA TRANSFER OPERATION

BACKGROUND OF THE INVENTION

This invention relates to computers and, more particularly, to a computer circuit for preempting a Direct Memory Access (DMA) or other data transfer operation.

A computer system typically includes a plurality of controllers for transferring data throughout the system. Each of these controllers is designed to transfer data in a unique way; for example, one controller may handle direct memory access (DMA) operations, while another handles selected slave operations. To control the flow of data, each of these controllers must have access to certain "system resources" within the system, such as a particular bus or bus interface circuit. Since some of these resources must be shared by more than one controller, the operations performed by each one of the controllers are, in most cases, mutually exclusive. Consequently, when two controllers have data to transfer through the system at the same time, something must resolve the contention between the two controllers.

Since DMA operations typically transfer large amounts of data and involve use of the system resources for extended periods of time, the DMA operation may be preempted to allow another controller temporary access to the system resources. When the preempting controller completes its data transfer operation, control of the resources is returned to the DMA controller and, after re-establishing ownership of the system resources, DMA operations continue at the point they were interrupted. The problem with this preemption scheme, however, is that additional time is required by the DMA controller to re-establish its control of the system resources after the preempting controller has completed its operations. It would be desirable, however, if the preemption could be "transparent" to the DMA such that when the preempting controller has completed its operation, control is returned to the DMA controller which continues its DMA operation without having to re-establish ownership resources. Accordingly, the invention described below is a circuit that permits transparent preemption of DMA or other data transfer operations.

SUMMARY OF THE INVENTION

Briefly, the invention is an interface circuit for controlling the flow of data between first and second computer buses. The interface circuit includes a first controller means for controlling the transfer of data. The first controller has an output port for a first control signal and an input port for receiving a second control signal. A second controller means is also included. The second controller has an output port for a third control signal and an input port for receiving the second control signal. A bus interface controller for transferring data to and from the first bus has an output port for the second control signal and an input port for receiving the first and third control signals from the first and second controller means. Break-in circuitry is included for blocking the first control signal from the bus interface controller in response to a request signal from the second controller to transfer data.

In another embodiment, the invention is a computer adapter card for use in a computer system having a first bus. The adapter card includes a second bus, as well as memory and a processor connected to the second bus. Included on the adapter card are first and second controller means for controlling the transfer of data. The first controller has an output port for a first control signal, and an input port for receiving a second control signal. The second controller has an output port for a third control signal, and an input port for receiving the second control signal. Also included is a bus interface controller for transferring data to and from the first bus. The bus interface controller has an output port for the second control signal, and an input port for receiving the first and third control signals from the first and second controllers. Break-in circuitry is included for blocking the first control signal from the bus interface controller in response to a request from the second controller to transfer data. Also included is means for connecting the adapter card to the first bus.

In still another embodiment, the invention is a break-in circuit, for use with first and second controller means for transferring data, and a bus interface controller for transferring data to and from a computer bus. The first controller has an output port for a first control signal and an input port for a second control signal. The second controller has an output port for a third control signal and an input port for the second control signal. The bus interface controller has an output port for the second control signal and an input port for the first and third control signals. The break-in circuit includes means for blocking the first control signal from the bus interface controller in response to a request signal from the second controller to transfer data. The break-in circuit also includes a means for blocking the second control signal from the first controller in response to the request signal from the second controller.

BRIEF DESCRIPTION OF THE DRAWINGS

FIG. 1 is a block diagram of a computer system with an adapter circuit employing a bus master interface circuit with data transfer break-in.

DESCRIPTION OF THE PREFERRED EMBODIMENTS

Figure 1:
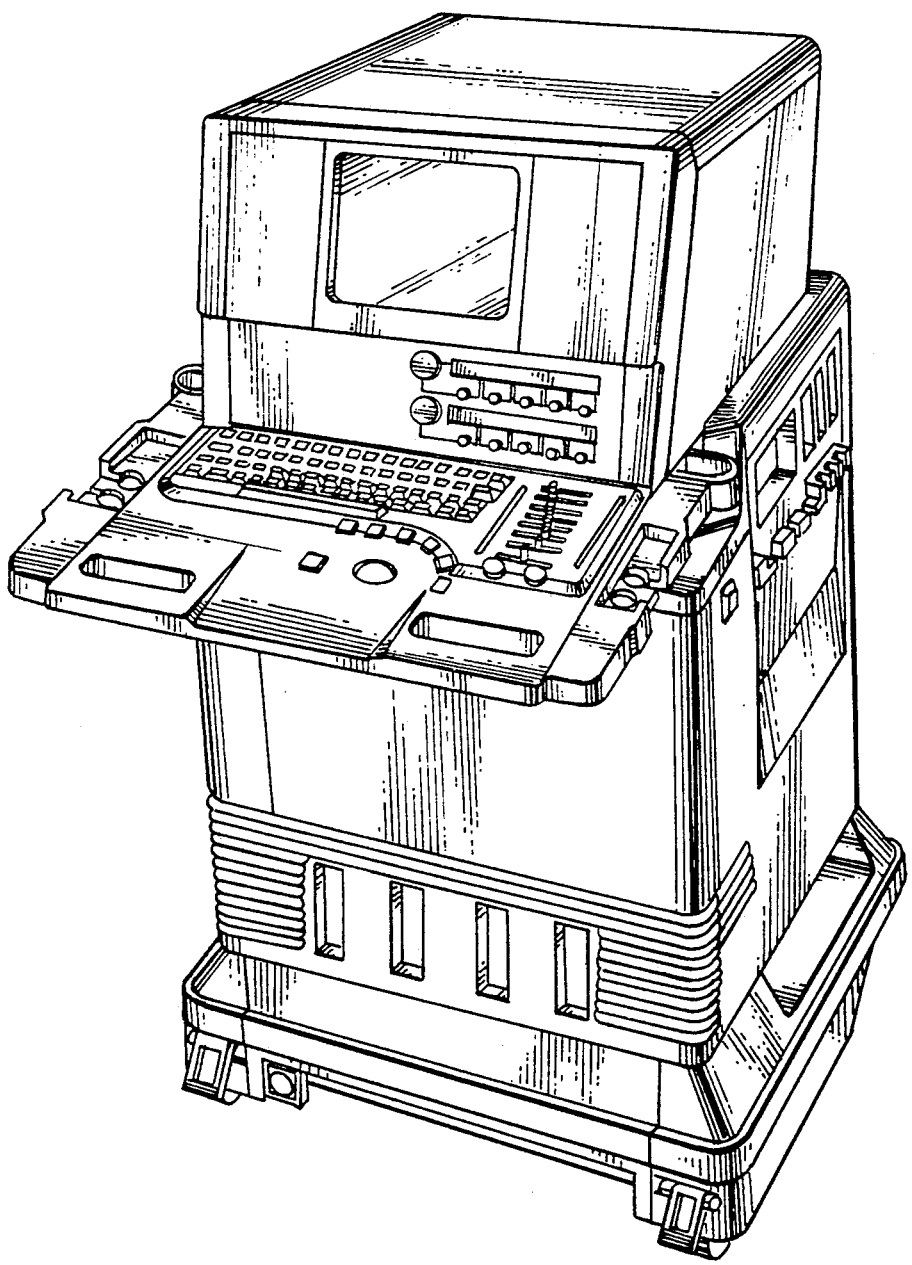

Referring to FIG. 1, a computer adapter card 102 is connected to the system bus 104 of a computer system. System bus 104 is preferably a well know Micro Channel (tm) bus, although other computer buses may also be suitable. Adapter card 102 includes a local bus 106 to which a local microprocessor 108 is connected. Local memory 120 is also connected to the local bus 106, and is directly addressable by the device currently in control of the local bus. A bus master interface circuit 110, which is divided into two modules 112 and 114, coordinates the transfer of data between system bus 104 and local bus 106. In general, the second module 114 controls the transfer of data through the first module 112.

Data and control signals are passed between the two modules on the "Control" and "IC Bus" lines. The "REQB" line is set active by the second module 114 when it requires control of the system bus 104 to transfer data to or from the system bus. In response to this request, a system bus arbitration circuit 115 in the first module 112 performs the functions necessary to gain control of the system bus; and when mastership of the system bus is "won", the first module sends an active SB_WON signal back to the second module, indicating that the second module now has control of the system bus.

Similarly, when the second module requires control of the local bus, it asserts HOLD active. In response to the HOLD request, the local microprocessor 108 will release control of the local bus and assert HLDA (Hold Acknowledge) active. When HLDA is active, the second module 114 can assume control of the local bus. When the data transfer is complete, the second module releases control of the local bus and sets HOLD inactive.

There are several "operations" for transferring data through the system. These data transfer operations are described below:

1. LBSS (Local Bus Selected Slave) In the LBSS operation, the interface circuit 110 is addressed as an I/O slave on the local bus 106. That is, the interface circuit includes non-illustrated registers that are directly addressable from the local bus by the device currently in control of the local bus.

2. LB_DMAC (Local Bus Direct Memory Access Controller) The interface circuit 110 is the master of the local bus 106 in this operation, and data is transferred between the local bus and the memory array 116 of the interface circuit. The memory array is an array of data buffers, e.g., 64 byte-wide registers, that are used in transferring data during DMA (Direct Memory Access) operations.

3. SB_DMAC (System Bus Direct Memory Access Controller) For this operation, the interface circuit 110 is the master of the system bus 104, and data is transferred between the system bus and the memory array 116.

4. SBSS (System Bus Selected Slave) The interface circuit 110 is addressed as an I/O slave on the system bus 104 in this data transfer operation. In other words, the interface circuit 110 includes non-illustrated registers that are directly addressable from the system bus by the device currently in control of the system bus.

5. SBMS (System Bus Memory Slave) In this data transfer operation, memory 120 on the local bus 106 is addressable from the system bus 104 as a memory slave. That is, when the master of the system bus asserts a particular address on the system bus, a corresponding memory address on the local bus 106 is accessed, such that data is transferred between memory on the local bus and the system bus. Or, in other words, local bus memory 120 is mapped onto system bus 104 in this operation.

6. DMAP (Direct Memory Access Port) For this operation, the interface circuit 110 is master of the system bus 104, and data transfers occur between data registers 118 and the system bus. Data registers 118 are directly accessible from the local bus 106 as I/O slaves.

Figure 2:
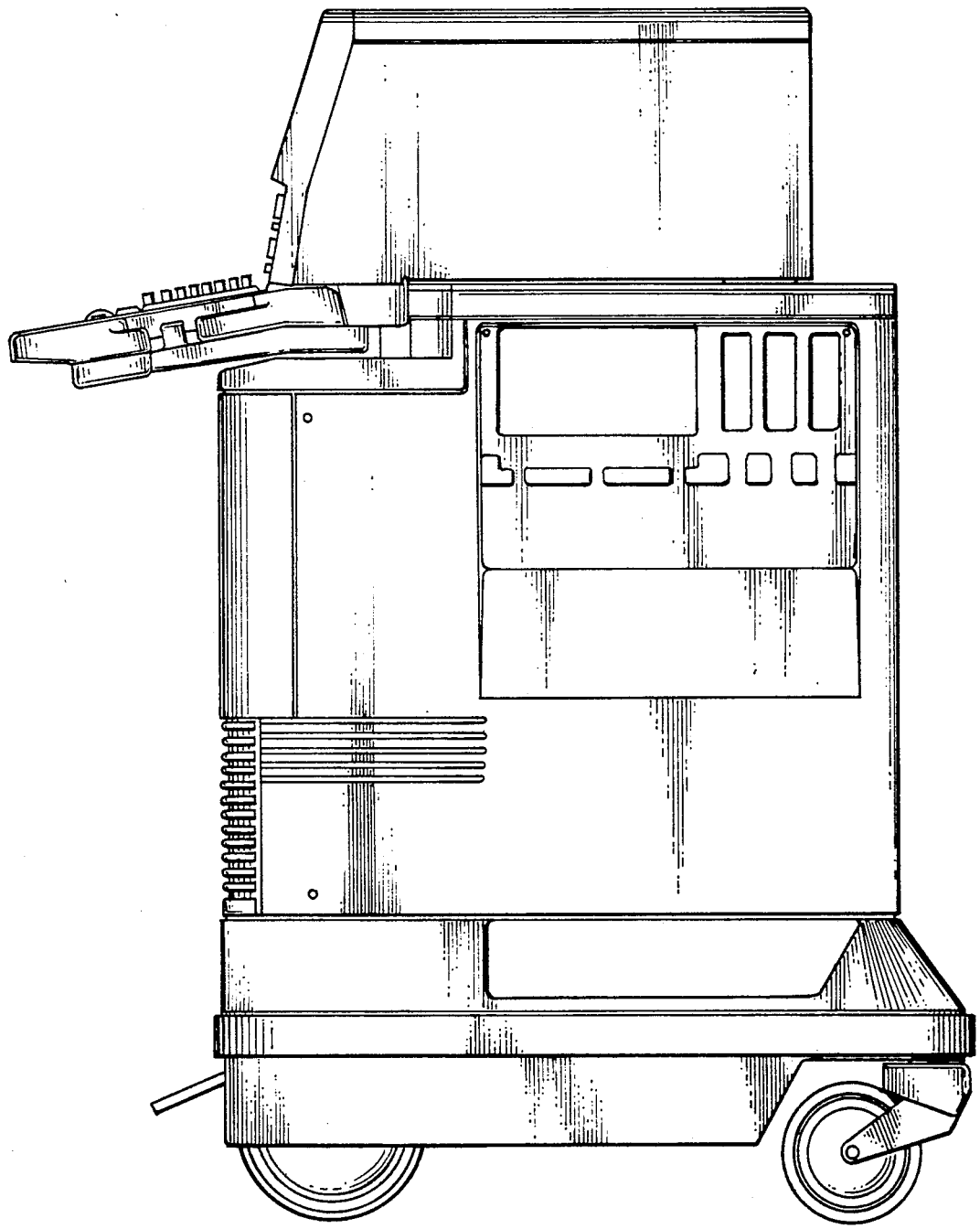
FIG. 2 is a block diagram of a portion of the bus master interface circuit.

In FIG. 2, a block diagram of the portion of the interface circuit that contains the break-in circuitry is illustrated. Referring to this figure, the interface circuit 110 includes a Direct Memory Access Controller (DMAC) 202 that controls both the SB_DMAC and LB_DMAC operations described above. In addition, this portion of the interface circuit also includes a Direct Memory Access Port (DMAP) controller 204 and a System Bus Selected Slave (SBSS) 206 controller. The SBSS controller also controls SBMS operations as well. The design of these controllers, as well as the design of arbiter 208 and local bus interface circuit 212 described below, are well know in the art. Their operation, however, is described in some detail below so that the reader can understand the interconnection to, and operation of the break-in logic 210.

When either one of the three controllers, DMAC 202, DMAP 204 or SBSS 206 has a data transfer operation to perform, it must first request control of the appropriate system resources to determine if they are available. Each of these controllers has a request or "REQ" line, which is connected to an internal arbiter 208, and which is set active when the controller has an operation to perform. Specifically, DMAC controller 202 sets LB_DMAC_REQ active when there is a local bus DMAC operation pending; DMAP 204 sets DMAP_REQ active when there is a DMA Port operation pending; and SBSS sets SBSS_REQ active when there is a system bus selected slave operation pending, and MS_REQ active when there is a system bus memory slave operation pending. If there is more than one request pending, the internal arbiter 208 determines which request should be granted first, based on a predetermined priority scheme. The internal arbiter 208 then issues a WON' signal to the particular controller that "won" the arbitration. For example, if the request was granted to the SBSS, SBSS_WON' would be set active. When a controller has "won", it takes control of its corresponding shared resources (buses, bus interface circuits, etc.) and initiates a data transfer.

But, if a DMAC operation is currently being executed on the local bus, and a request is asserted for either a DMAP operation (DMAP_REQ), an SBSS operation (SBSS_REQ) or an SBMS operation (MS_REQ), these operations may "break-in" to the current DMAC operation, thereby temporarily suspending the DMAC operation. This is accomplished by the break-in logic 210.

Figure 3:
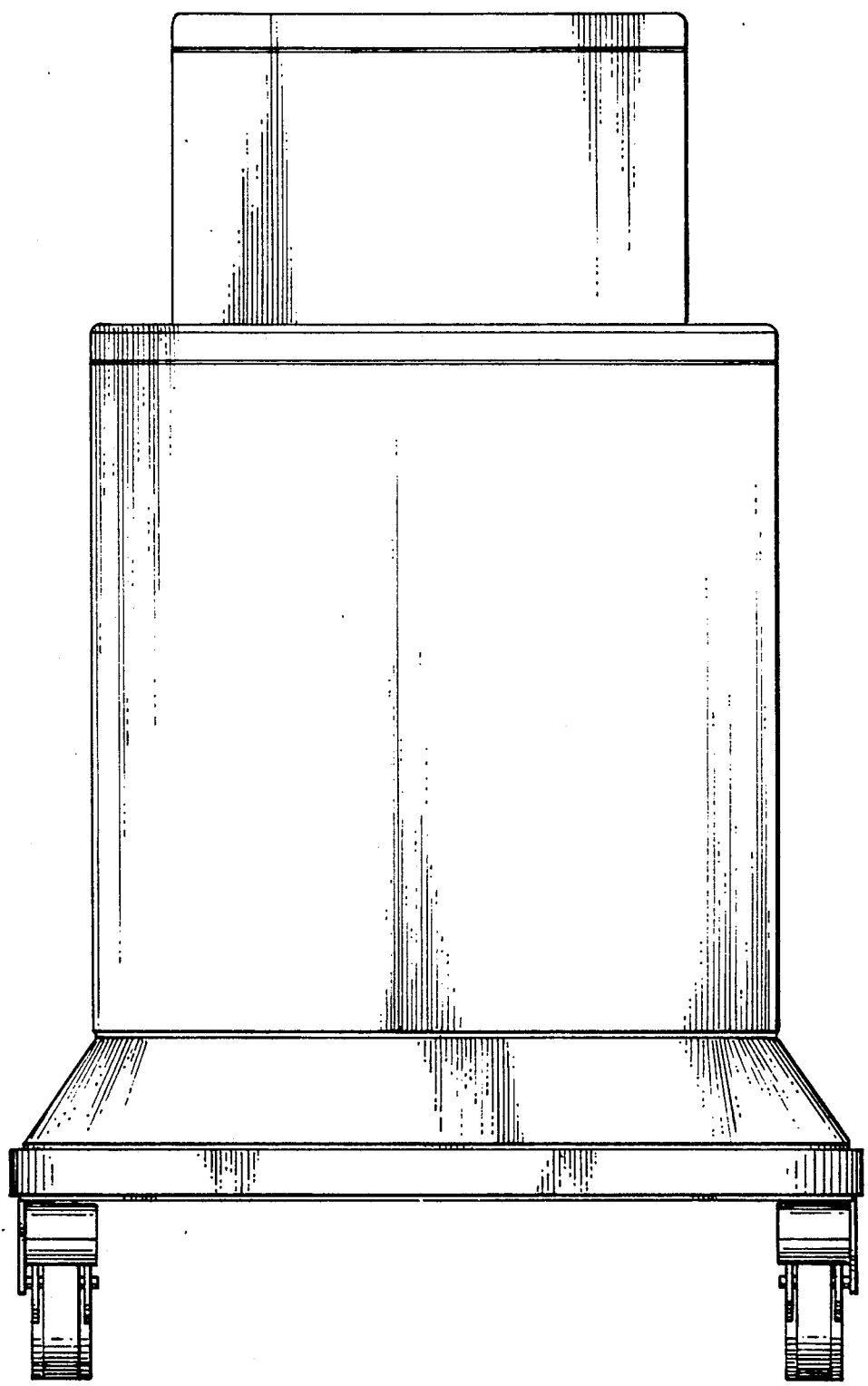
FIG. 3 is a timing diagram illustrating the data transfer break-in operation of the interface circuit.

Referring to FIG. 2, and to the timing diagram of FIG. 3, the DMAC first requests a local bus DMAC operation by asserting LB_DMAC_REQ active. In response to this request, the internal arbiter 208 sends an active HOLD request to the local microprocessor 108, which in turn responds with a HOLDA signal when it releases control of the local bus 106. In response to the release of the local bus, the internal arbiter sets LB_DMAC_WON active to indicate to the DMAC that it may begin a data transfer operation.

To perform a DMAC operation on the local bus, the DMAC controller 202 first asserts the local bus cycle start or LB_CYC_START line active. If there are no current break-in operations, the BLOCK_START line from the break-in logic 210 is set low and, consequently, the active LB_CYC_START signal from DMAC 202 is coupled through AND gate 214 and OR gate 216 to a local bus interface controller 212. The local bus interface controller then begins the DMAC data transfer operation on the local bus and, in response, pulses a local bus cycle acknowledge or LB_CYC_ACK line. When no break-in operations are current, the BLOCK_ACK output from the break-in logic 210 is set low and, consequently, the LB_CYC_ACK signal is coupled back to the DMAC through AND gate 218. This completes the handshake between the DMAC 202 and the local bus interface circuit 212, and allows the DMAC data transfer to continue. It should be noted that the cycle start line LB_CYC_START from the DMAC remains active as long as the DMAC has data transfers to perform and as long as the LB_DMAC_WON signal is active. Similarly, the local bus interface circuit 212 will pulse the cycle acknowledge signal LB_CYC_ACK once for every data transfer that it performs on the local bus.

If, for example, the SBSS controller 206 now needs control of the system resources of the interface circuit to perform a memory slave operation (SBMS), it asserts the SBMS_REQ line active. Since the internal arbiter has already granted control of the internal resources to the DMAC controller by asserting LB_DMAC_WON, it cannot respond to the request from the SBSS controller until the DMAC operation is complete. But, the active SBMS_REQ is also coupled to the break-in logic 210, which can and does respond to the request by setting BI_SBMS_WON active. This active BI_SBMS_WON signal is then coupled to the SBSS controller, which begins the requested memory slave operation. But first, the break-in logic asserts the BLOCK_START line high, which "blocks" or inhibits the LB_CYC_START signal at AND gate 214 and prevents it from reaching the local bus interface circuit 212. After blocking the cycle start signal, the break-in logic sets BLOCK_ACK active, which blocks the cycle acknowledge signal LB_CYC_ACK from reaching the DMAC controller 202. Consequently, it appears to the DMAC controller that it still has control of the local bus controller 212, and that the local bus interface is simply slow in responding to its request. However, the SBSS controller actually has temporary control of the local bus interface circuit 212.

When the SBSS controller has completed its data transfers, it sets the SBMS_REQ line inactive and, in response, the break-in logic sets both blocking signals inactive, thereby unblocking the cycle start and cycle acknowledge signals, and returning control of the resources to the DMAC controller.

Figure 4:
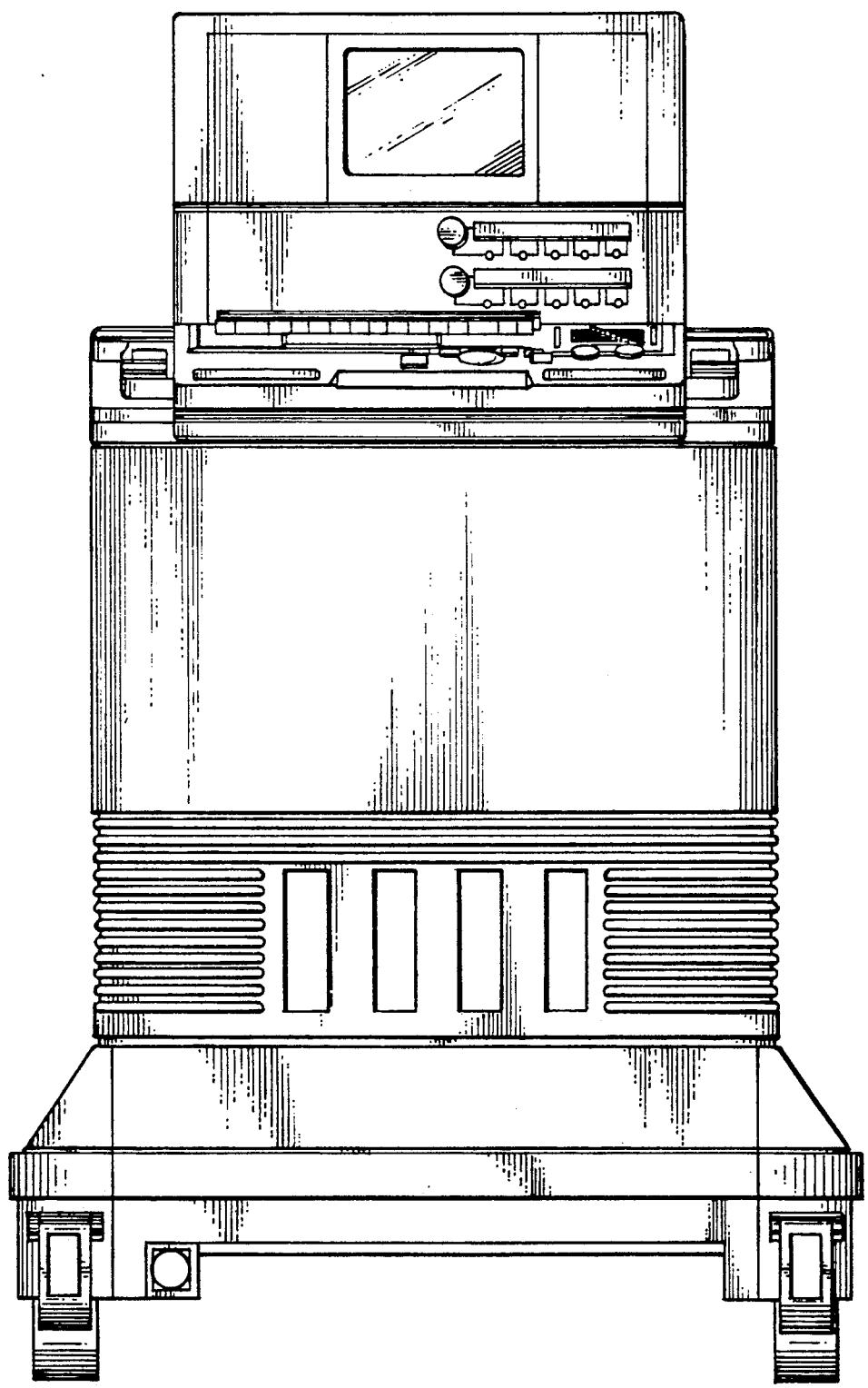
FIG. 4 is a schematic diagram of the break-in circuitry.
Figure 5:
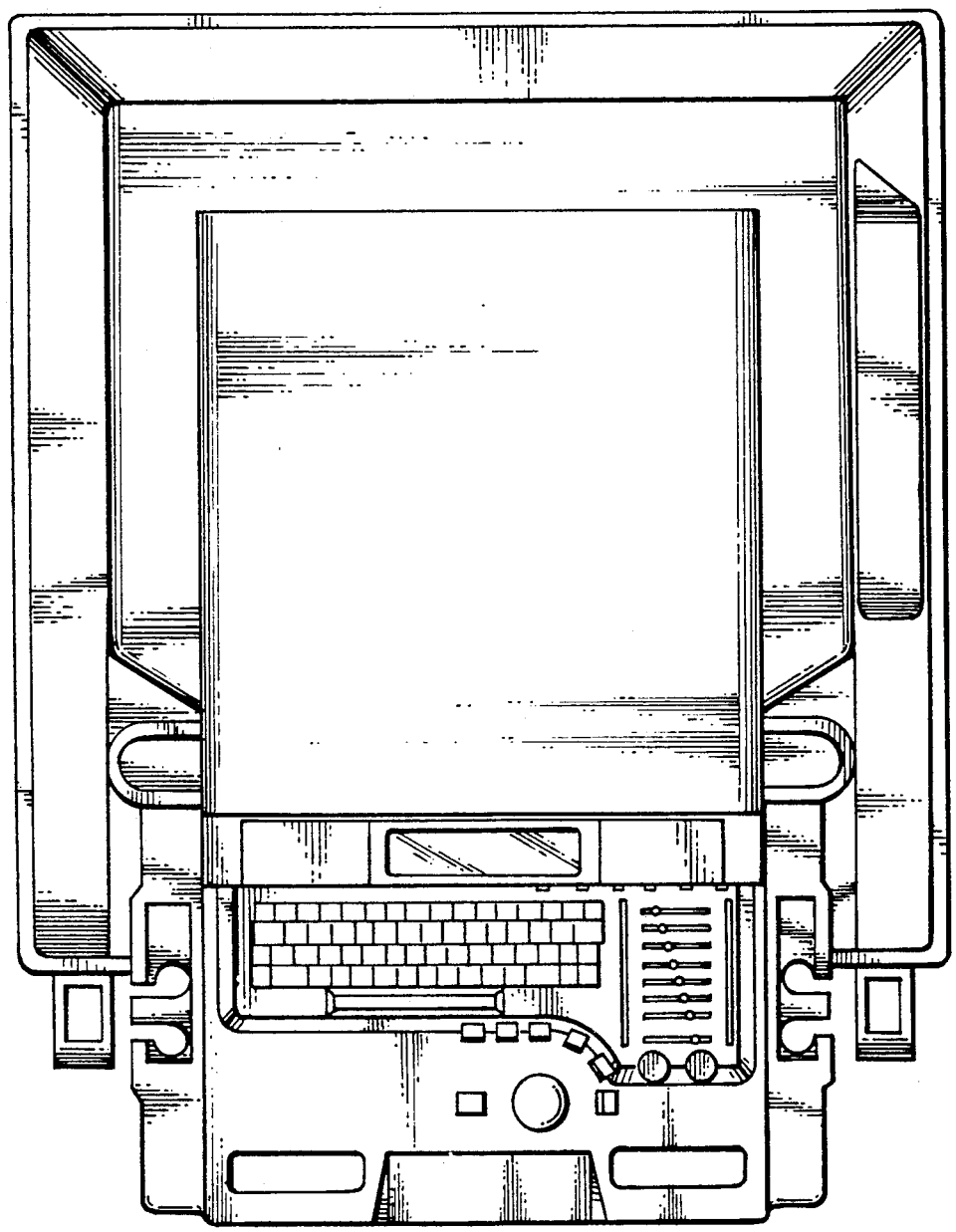
FIG. 5 is a state diagram of the data transfer break-in operation.
Figure 1:
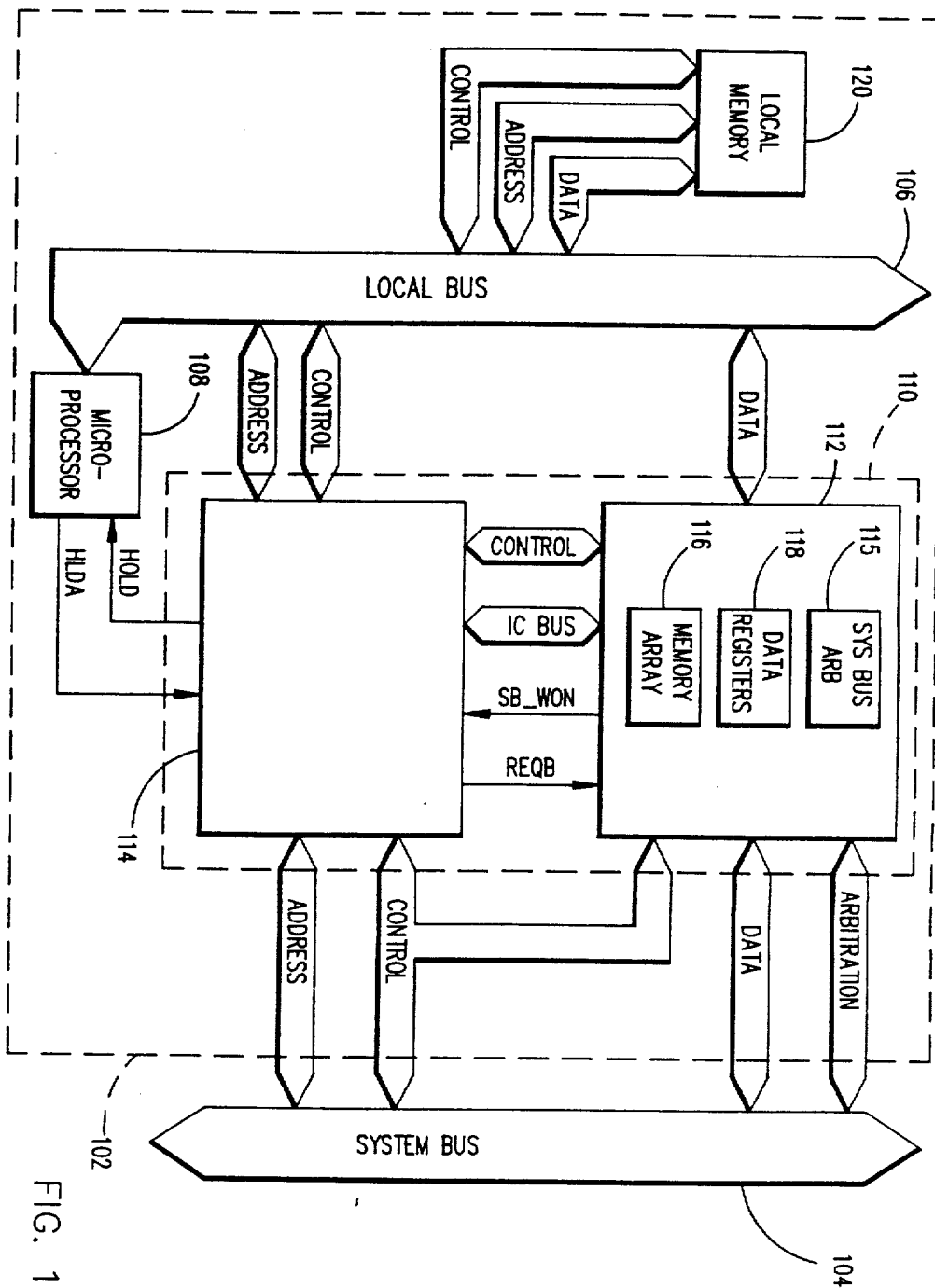
Figure 2:
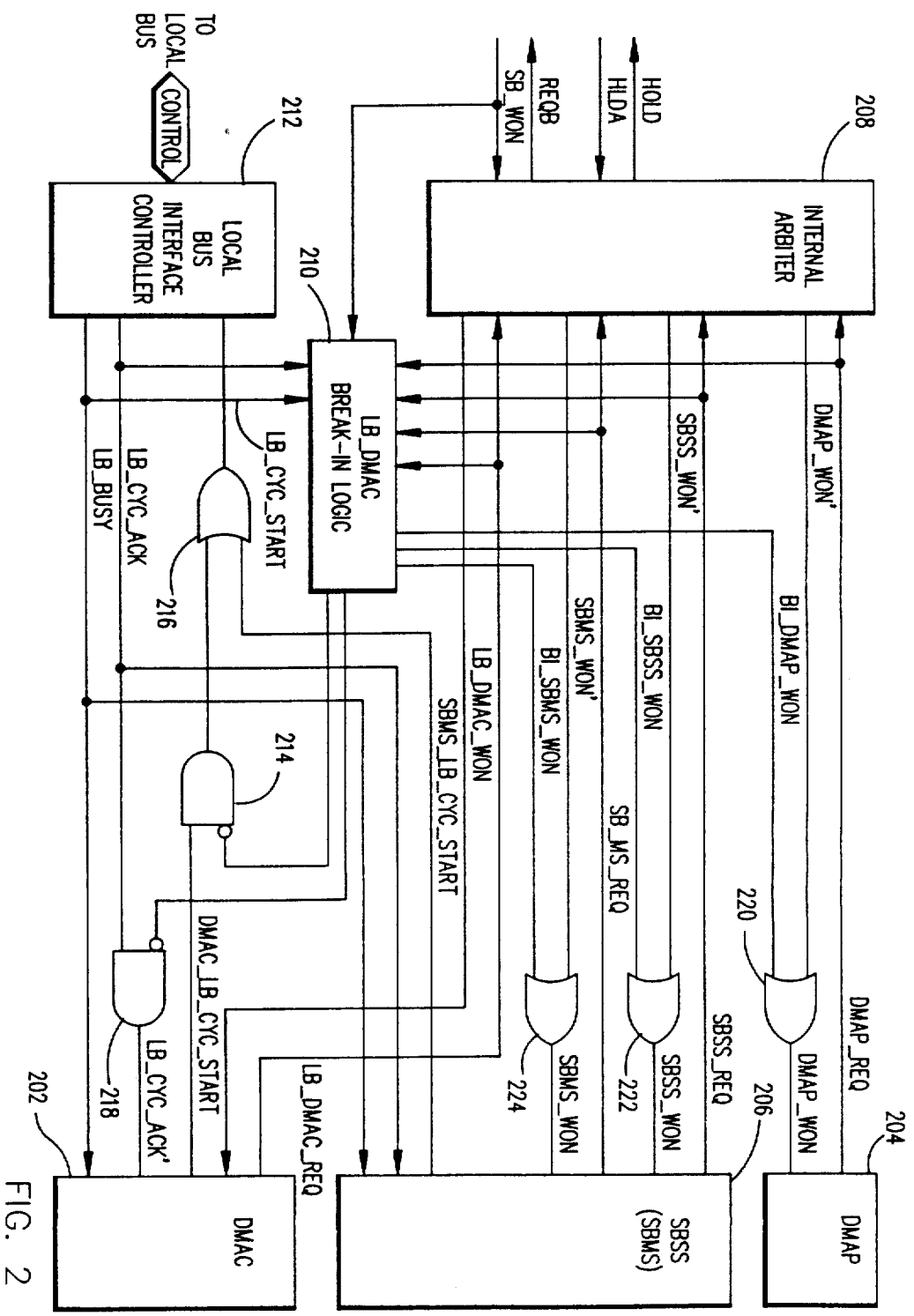
Figure 3:
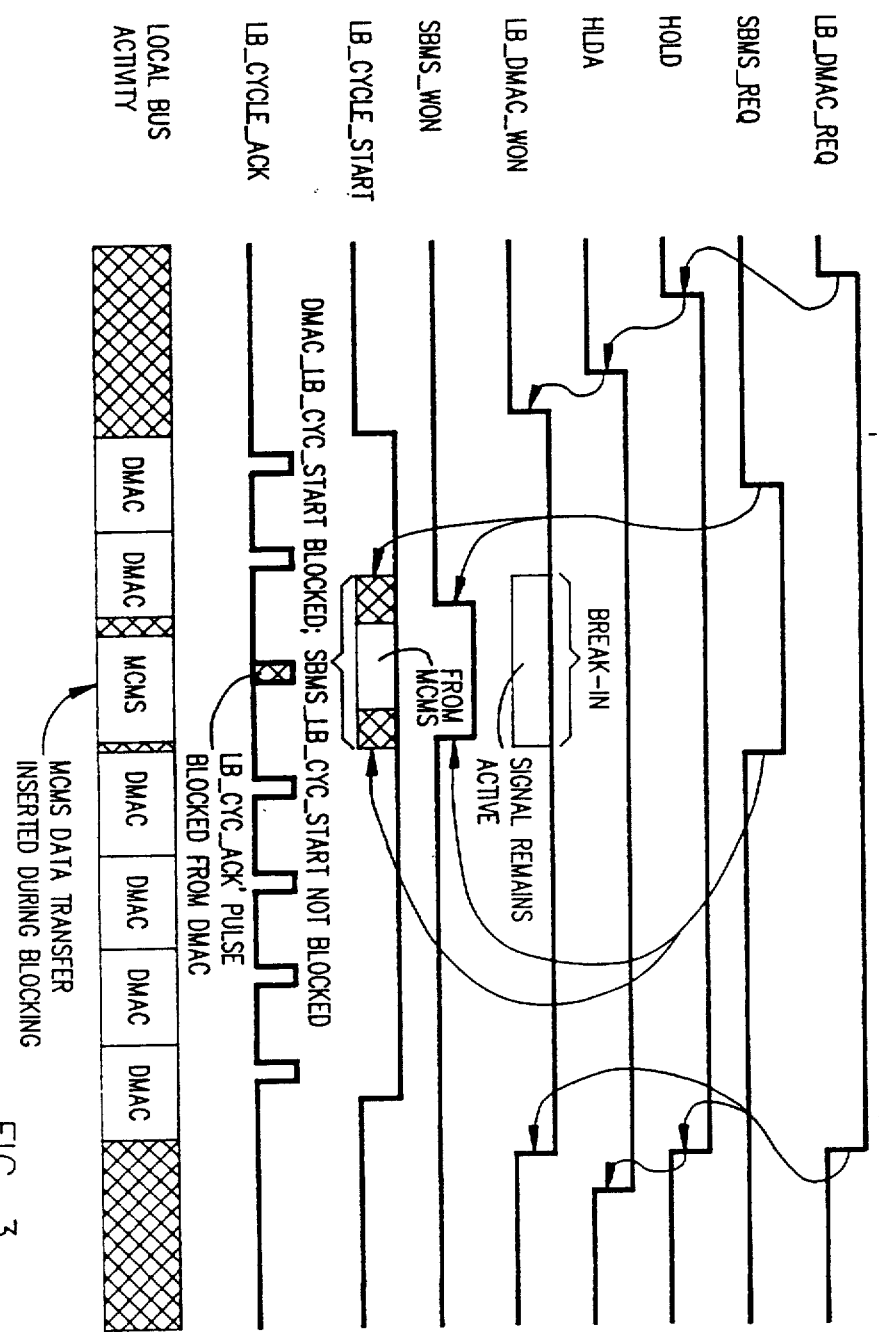
Figure 4:
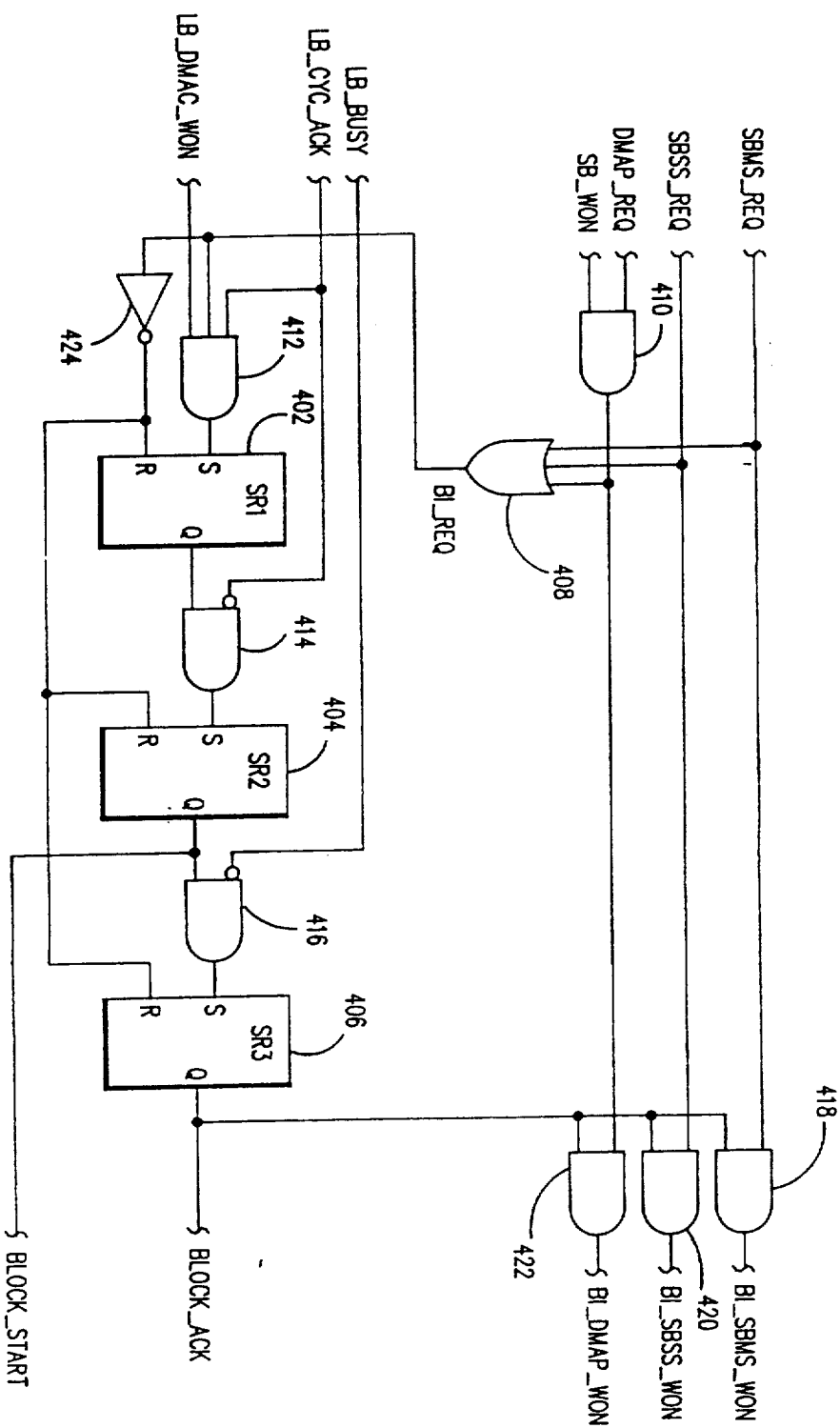
Figure 5:
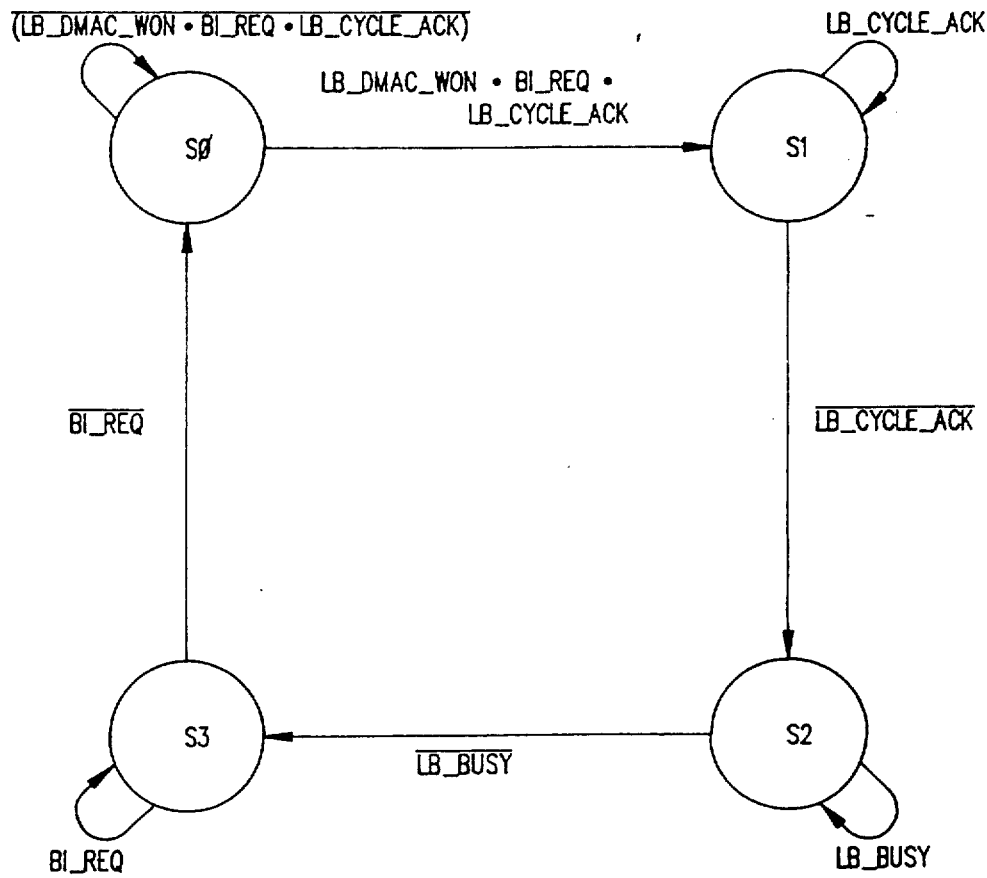

FIG. 4 is a schematic diagram of break-in logic 210, and FIG. 5 is a state diagram of the operation of the break-in logic. Referring to these figures, the break-in logic has four (4) states, labeled S0, S1, S2 and S3 in FIG. 5. These four states correspond to the following states of asynchronous SR latches SR1 (402), SR2 (404) and SR3 (406) of FIG. 4:

|    | SR1   | SR2   | SR3   |
|----|-------|-------|-------|
| S0 | RESET | RESET | RESET |
| S1 | SET   | RESET | RESET |
| S2 | SET   | SET   | RESET |
| S3 | SET   | SET   | SET   |

When a local bus DMAC operation is underway such that LB_DMAC_WON is active, the break-in circuit is waiting in state S0 for a break-in request BI_REQ to occur. BI_REQ will be asserted active through OR gate 408 and AND gate 410 in response to a system bus memory slave operation request (SBMS_REQ), a system bus selected slave operation request (SBSS_REQ), or a direct memory access port operation request (DMAP_REQ) in which SB_WON has been asserted active. When break-in request (BI_REQ) is active, SR1 is set through AND gate 412 at the next cycle acknowledge pulse from the local bus interface circuit 212. And, when the cycle acknowledge pulse goes low, the circuit enters the S2 state when latch SR2 is set through AND gate 414. In the S2 state, the BLOCK_START signal is asserted active. When LB_BUSY goes low, the circuit enters the third state wherein latch SR3 is set through AND gate 416. LB_BUSY is a signal from the local bus interface circuit that simply indicates that the local bus interface circuit is busy completing its current operation. In state S3, the corresponding break-in won signal is set active through AND gate 418, 420 or 422. As shown in FIG. 2, the won signal, BI_DMAP_WON, BI_SBSS_WON or BI_SBMS_WON, enables the corresponding controller 202, 204 or 206 through one of the OR gates 220, 222 or 224, which then performs its data transfer. When the controller removes the active request signal (SBMS_REQ, SBSS_REQ or DMAP_REQ), latches SR1, SR2 and SR3 are reset through inverter 424, thereby completing the break-in operation and returning control to the DMAC.

We claim as our invention:

1. An interface circuit for controlling the flow of data to and from a computer bus, said interface circuit comprising in combination:
   a first controller means for controlling the transfer of data, said first controller means having an output port for a first control signal and an input port for receiving a third control signal;
   a second controller means for controlling the transfer of data, said second controller means having an output port for a second control signal and an input port for receiving said third control signal;
   a bus interface controller for transferring data to an from said computer bus, said bus interface controller having an input port for receiving said first and second control signals from said first and second controller means, and an output port for said third control signal; and
   break-in circuitry for blocking said first control signal from said bus interface controller in response to a request signal from said second controller means to transfer data, and for blocking said third control signal from said first controller means in response to said request signal from said second controller means to transfer data, said break-in circuitry comprising:
   logic circuitry having first, second and third states, said first state being an idle state, said first control signal being blocked from said bus interface controller in said third state, said logic circuitry advancing from said first to said second and then third states in response to the pulsing of said third control signal.

2. The interface circuit of claim 1, wherein said logic circuitry further comprises:
   a fourth state wherein said third control signal being blocked from said first controller means in said fourth state.

3. A computer adapter card, for use in a computer system having a first bus, said adapter card comprising in combination:
   a second bus;
   memory and a processor connected to said second bus;
   a first controller means for controlling the transfer of data, said first controller means having an output port for a first control signal, and having an input port for receiving a second control signal;
   a second controller means for controlling the transfer of data, said second controller means having an output port for a third control signal, and an input port for receiving said second control signal;

a bus interface controller for transferring data to and from said second bus, said bus interface controller having an output port for said second control signal, and an input port for receiving said first and third control signals from said first and second controller means; and break-in circuitry for blocking said first control signal from said bus interface controller in response to a request signal from said second controller means to transfer data.

4. The adapter card of claim 3, wherein said break-in circuitry further comprises:

logic circuitry having first and second states, said first state being an idle state, and said first control signal is blocked from said bus interface controller in said second state, said logic circuitry advancing from said first to said second state in response to the pulsing of said second control signal.

5. The adapter card of claim 3, wherein said break-in circuitry further comprises:

means for blocking said second control signal from said first controller means in response to said request signal from said second controller means to transfer data.

6. The adapter card of claim 5, wherein said break-in circuitry further comprises:

logic circuitry having first and second states, said first state being an idle state, said second control signal being blocked from said first controller means in said second state.

7. The adapter card of claim 5, wherein said break-in circuitry further comprises:

logic circuitry having first and second states, said first control signal being blocked from said bus interface controller in said first state, and said second control signal being blocked from first controller means in said second state.

8. The adapter card of claim 5, wherein said break-in circuitry further comprises:

logic circuitry having first, second and third states, said first state being an idle state, said first control signal being blocked from said bus interface controller in said third state, said logic circuitry advancing from said first to said second and then third states in response to the pulsing of said second control signal.

9. The adapter card of claim 5, wherein said break-in circuitry further comprises:

logic circuitry having first, second, third and fourth states, said first state being an idle state, said first control signal being blocked from said bus interface controller in said third state, and said second control signal being blocked from first controller means in said fourth state, said logic circuitry advancing from said first to said second and then third states in response to the pulsing of said second control signal.

10. A break-in circuit, for use with first and second controller means for controlling the transfer of data, and a bus interface controller for transferring data to and from a computer bus, said first controller means having an output port for a first control signal and an input port for a second control signal, said second controller means having an output port for a third control signal and an input port for said second control signal, said bus interface controller having an output port for said second control signal and an input port for said first and third control signals, said break-in circuit comprising in combination:

means for blocking said first control signal from said bus interface controller in response to a request signal from said second controller means to transfer data; and means for blocking said second control signal from said first controller means in response to said request signal from said second controller means to transfer data.

11. The break-in circuit of claim 10, further comprising:

logic circuitry having first and second states, said first state being an idle state, said second control signal being blocked from said first controller means in said second state.

12. The break-in circuit of claim 10, further comprising:

logic circuitry having first and second states, said first control signal being blocked from said bus interface controller in said first state, and said second control signal being blocked from first controller means in said second state.

13. The break-in circuit of claim 10, further comprising:

logic circuitry having first, second and third states, said first state being an idle state, said first control signal being blocked from said bus interface controller in said third state, said logic circuitry advancing from said first to said second and then third states in response to the pulsing of said second control signal.

14. The interface circuit of claim 10, further comprising:

logic circuitry having first, second, third and fourth states, said first state being an idle state, said first control signal being blocked from said bus interface controller in said third state, and said second control signal being blocked from first controller means in said fourth state, said logic circuitry advancing from said first to said second and then third states in response to the pulsing of said second control signal.

* * * * *

UNITED STATES PATENT AND TRADEMARK OFFICE
CERTIFICATE OF CORRECTION

PATENT NO. : 5,119,480

DATED : June 2, 1992

INVENTOR(S) : Garcia, Jr. et al

Page 1 of 7

It is certified that error appears in the above-identified patent and that said Letters Patent is hereby corrected as shown below:

ON THE TITLE PAGE

The Title page should be deleted, and substitute therefor the attached Title page.

IN THE DRAWINGS

Delete Drawing Sheets 1-5, and substitute therefor the Drawing Sheets, consisting of Figs. 1-5, as shown on the attached pages.

Signed and Sealed this

Twenty-sixth Day of October, 1993

*Attest:*

BRUCE LEHMAN

*Attesting Officer*     *Commissioner of Patents and Trademarks*

United States Patent [19]

Garcia, Jr. et al.

[11] Patent Number: 5,119,480
[45] Date of Patent: Jun. 2, 1992

[54] BUS MASTER INTERFACE CIRCUIT WITH TRANSPARENT PREEMPTION OF A DATA TRANSFER OPERATION

[75] Inventors: Serafin J. E. Garcia, Jr., Boynton Beach; Douglas R. Chisholm, Chatelaine; Dean A. Kalman, Lantana; Russell S. Padgett, Royal Palm Beach; Robert D. Yoder, Delray Beach, all of Fla.

[73] Assignee: International Business Machines Corporation, Armonk, N.Y.

[21] Appl. No.: 434,385

[22] Filed: Nov. 13, 1989

[51] Int. Cl.⁵ ............................................. G06F 13/32
[52] U.S. Cl. ................................. 395/325; 364/241.2; 364/241.3; 364/242.3; 364/242.31; 364/242.32; 364/242.6; 364/941; 364/941.1
[58] Field of Search ................................. 364/200, 900

[56] References Cited

U.S. PATENT DOCUMENTS

| | | | |
|---|---|---|---|
| 4,270,167 | 5/1981 | Koehler et al. | 364/200 |
| 4,620,278 | 10/1986 | Ellsworth et al. | 364/200 |
| 4,777,591 | 10/1988 | Chang et al. | 364/200 |
| 4,837,677 | 6/1989 | Burrus, Jr. et al. | 364/200 |
| 4,901,226 | 2/1990 | Barlow | 364/200 |
| 4,953,103 | 8/1990 | Suzuki | 364/200 |
| 4,959,782 | 9/1990 | Tulpule et al | 364/200 |

Primary Examiner—Allen R. MacDonald
Assistant Examiner—Robert S. Hauser
Attorney, Agent, or Firm—Martin J. McKinley

[57] ABSTRACT

A plurality of specialized controllers (e.g., 202, 204 & 206), each one adapted to control a particular type of data transfer operation, control the flow of data between a system bus (104) and a local bus (106) on a computer adapter card (102). When the Direct Memory Access (DMA) controller (202) is controlling a DMA operation on the local bus, certain other controllers (204 & 206) can break-in to the current DMA operation, temporarily halting the DMA opertion until the other controller has completed its data transfer operation. To break-in to a DMA operation, handshaking signals between the DMA controller and the local bus interface circuit (212) are temporarily blocked by blocking signals from a break-in logic circuit (210). The break-in circuit includes a four-state state machine to block the handshaking signals at the appropriate times, and to signal the interrupting controller to begin its data transfer operation. When breaking-in to a DMA operation in this manner, the operation of the DMA controller is not altered; instead, to the DMA controller, it appears that the local bus interface circuit is merely slow to respond with its acknowledge handshake.

14 Claims, 5 Drawing Sheets

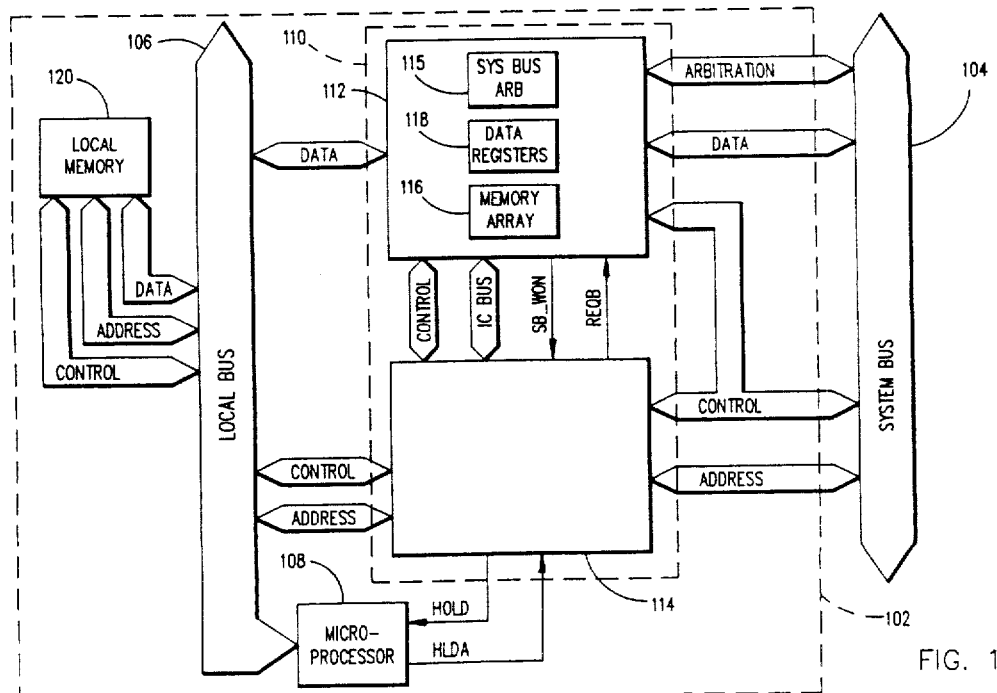

FIG. 1

BI_REQ = SBSS_REQ + SBMS_REQ + (DMAP_REQ • WON)

LB_CYCLE_START IS BLOCKED DURING S2 & S3
LB_CYCLE_ACK IS BLOCKED DURING S3
THE ACTIVE BREAK-IN REQUEST IS GRANTED A "WON" DURING S3 :

SBSS_WON = SBSS_WON' + (S3 • SBSS_REQ)
SBMS_WON = SBMS_WON' + (S3 • SBMS_REQ)
DMAP_WON = DMAP_WON' + (S3 • DMAP_REQ • WON)